United States Patent

Haramura et al.

[11] Patent Number: 5,836,739
[45] Date of Patent: Nov. 17, 1998

[54] GAS TURBINE ENGINE

[75] Inventors: Shigenori Haramura, Hove; Peter H. Birch, Horsham; Mark G. Norton, Hove; Michael J. Raine, Kenilworth; Graham A. Reynolds, Finham, all of United Kingdom

[73] Assignee: Rolls-Royce plc, London, England

[21] Appl. No.: 955,300

[22] Filed: Oct. 21, 1997

Related U.S. Application Data

[63] Continuation of Ser. No. 602,184, Nov. 15, 1996, abandoned.

[30] Foreign Application Priority Data

Mar. 17, 1995 [GB] United Kingdom .................. 9505452

[51] Int. Cl.$^6$ ........................................... F01D 3/04
[52] U.S. Cl. ........................................ 415/104; 415/107
[58] Field of Search ................... 415/104, 105, 415/107

[56] References Cited

U.S. PATENT DOCUMENTS

| | | | |
|---|---|---|---|
| 4,057,369 | 11/1977 | Isenberg et al. | 415/107 |
| 4,725,197 | 2/1988 | Russell et al. | 415/104 |
| 4,775,291 | 10/1988 | Culbertson et al. | 415/104 |
| 5,104,284 | 4/1992 | Hustak, Jr. et al. | 415/105 |
| 5,127,792 | 7/1992 | Katsuta et al. | 415/104 |
| 5,248,239 | 9/1993 | Andrews | 415/104 |
| 5,445,494 | 8/1995 | Hanson | 415/107 |

FOREIGN PATENT DOCUMENTS

| | | |
|---|---|---|
| 0361844 A2 | 4/1990 | European Pat. Off. . |
| 1051595 | 12/1966 | United Kingdom . |
| 2121479 | 12/1983 | United Kingdom . |
| 2130655 | 6/1984 | United Kingdom . |
| 2258699 | 2/1993 | United Kingdom . |

*Primary Examiner*—John T. Kwon
*Attorney, Agent, or Firm*—W. Warren Taltavull; Farkas & Manelli pllc

[57] ABSTRACT

A gas turbine engine comprises turbine and compressor elements on a rotary shaft. The shaft is rotably mounted on preloaded axial thrust bearings. As it rotates in use the turbine and compressor elements create an axial thrust load on the bearings. According to the invention that axial thrust load is opposed by an electromagnetic coil which is energised to exert an axial force on the shaft in opposition to the axial thrust load and preferably completely balancing the axial thrust load. Bearing life is much extended.

10 Claims, 2 Drawing Sheets

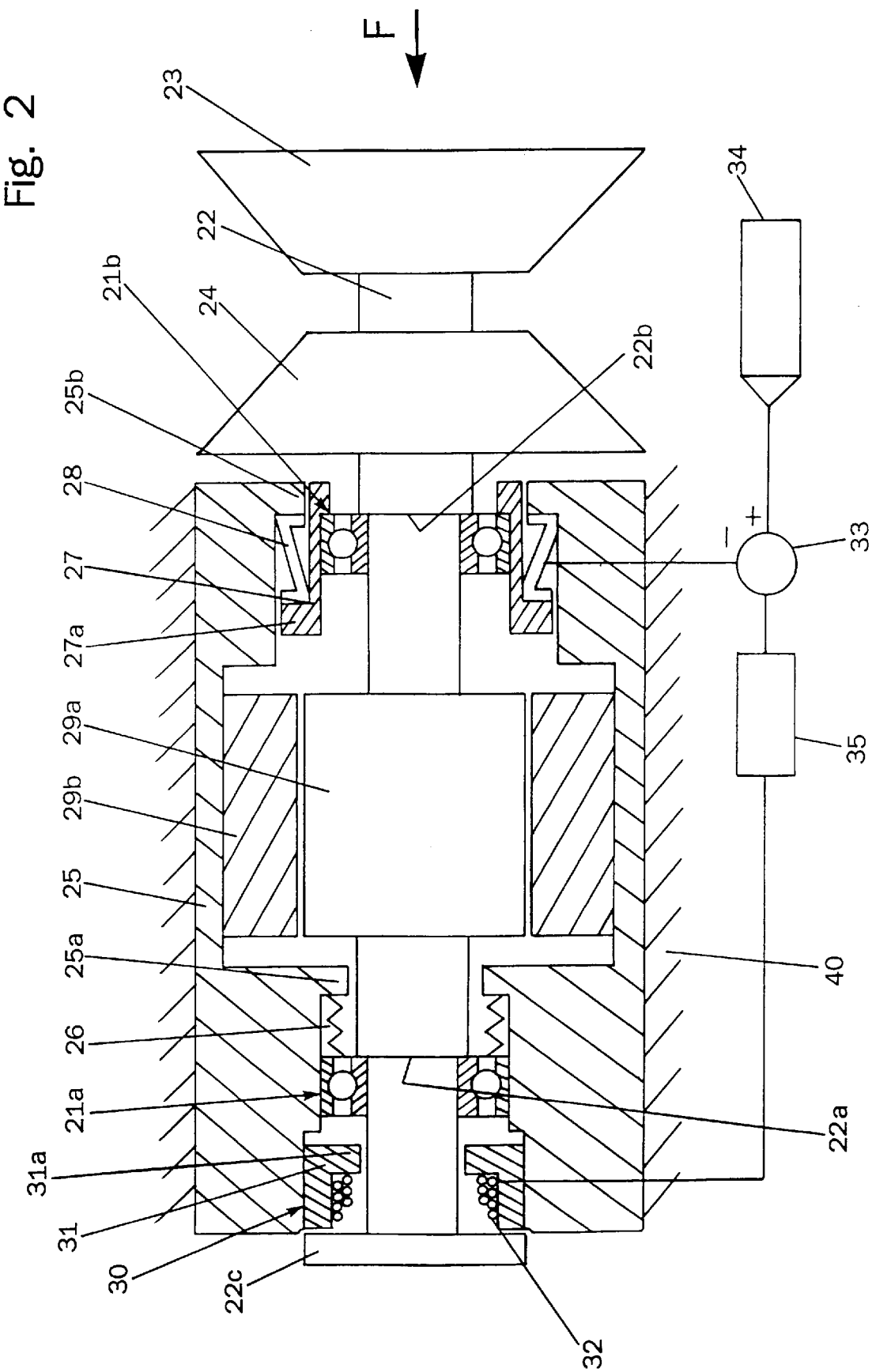

GAS TURBINE ENGINE

This is a continuation of application Ser. No. 08/602,184, filed Nov. 15, 1996, which was abandoned upon the filling hereof.

BACKGROUND OF THE INVENTION

1. Field of the Invention

The present invention relates to a gas turbine, and more particularly to a gas turbine having electromagnetic means for opposing axial thrust loads acting on the turbine shaft in use.

2. Description of the Prior Art

With shaft systems where an axial load is present it is common practice to use either angular contact ball bearings, other rolling element thrust bearings such as taper roller bearings or plain thrust bearings which may be oil lubricated for higher speeds and loads. In general, since oil lubricated plain thrust bearings whether radial or axial are far less efficient than equivalent angular contact bearings, as shown in SKF 21 "Optimum Bearing Arrangements for Machine Tools" publication No. 3139 published in September 1981, angular contact bearings are used for gas turbine engines in which a high axial load acts on the shaft. Extreme accuracy is required in the positioning of the shaft in such turbines.

Angular contact bearings and rolling element thrust bearings rely on a pre-load in order to prevent the rolling elements "skidding", to minimize vibration and maintain correct shaft position. The shaft of a gas turbine engine mounts both a compressor and a turbine and in general it is not possible to match completely the thrust loads produced by the compressor and turbine. This often results in a net axial thrust load in the direction of the compressor and this axial thrust load can act on the shaft in addition to the pre-load. When the axial thrust load is much higher than the pre-load, the elements are prone to fatigue stresses leading to shorter life, increased losses due to friction, and increased wear. Therefore, it is necessary to exchange the angular contact bearing or rolling element thrust bearing comparatively often.

THE INVENTION

The invention provides a gas turbine engine comprising turbine and compressor elements on a rotary shaft that is rotatably mounted in a stator body by bearings, in which there are provided electromagnetic means for opposing axial thrust loads on the shaft in use, comprising an electromagnetic coil supported in the stator body and surrounding the shaft, and means for energizing the electromagnetic coil in use to exert an electromagnetic axial force on the shaft to oppose axial thrust loads on the shaft resulting from rotation of the turbine and compressor elements. The net thrust load on the shaft is reduced or even completely balanced in the gas turbine of the invention, and the shaft can be maintained in a desired axial position over a range of shaft speeds.

The invention is of great benefit in connection with shaft systems in which an axial load is intended to be present, for example when the rotary shaft is rotably mounted in the stator body by pre-loaded axial thrust bearings such as angular contact ball bearings. The invention permits that axial load to be maintained, within predetermined limits. The invention is however not restricted to the use of such pre-loaded bearings and indeed one advantage of the invention is the potential ability totally to balance axial loads that would otherwise be exerted on the bearings in use. Thus a shaft system in a gas turbine engine according to the invention may be one in which the bearing is not specifically designed to absorb axial thrust at all, with all axial thrust loads in use being compensated and balanced by the electromagnetic force on the shaft.

DRAWINGS

FIG. 1 is a schematic view of a first embodiment of a gas turbine engine in accordance with the present invention; and FIG. 2 is a schematic view of a second embodiment of a gas turbine engine in accordance with the present invention.

DESCRIPTION OF THE PREFERRED EMBODIMENTS

Figure 1:
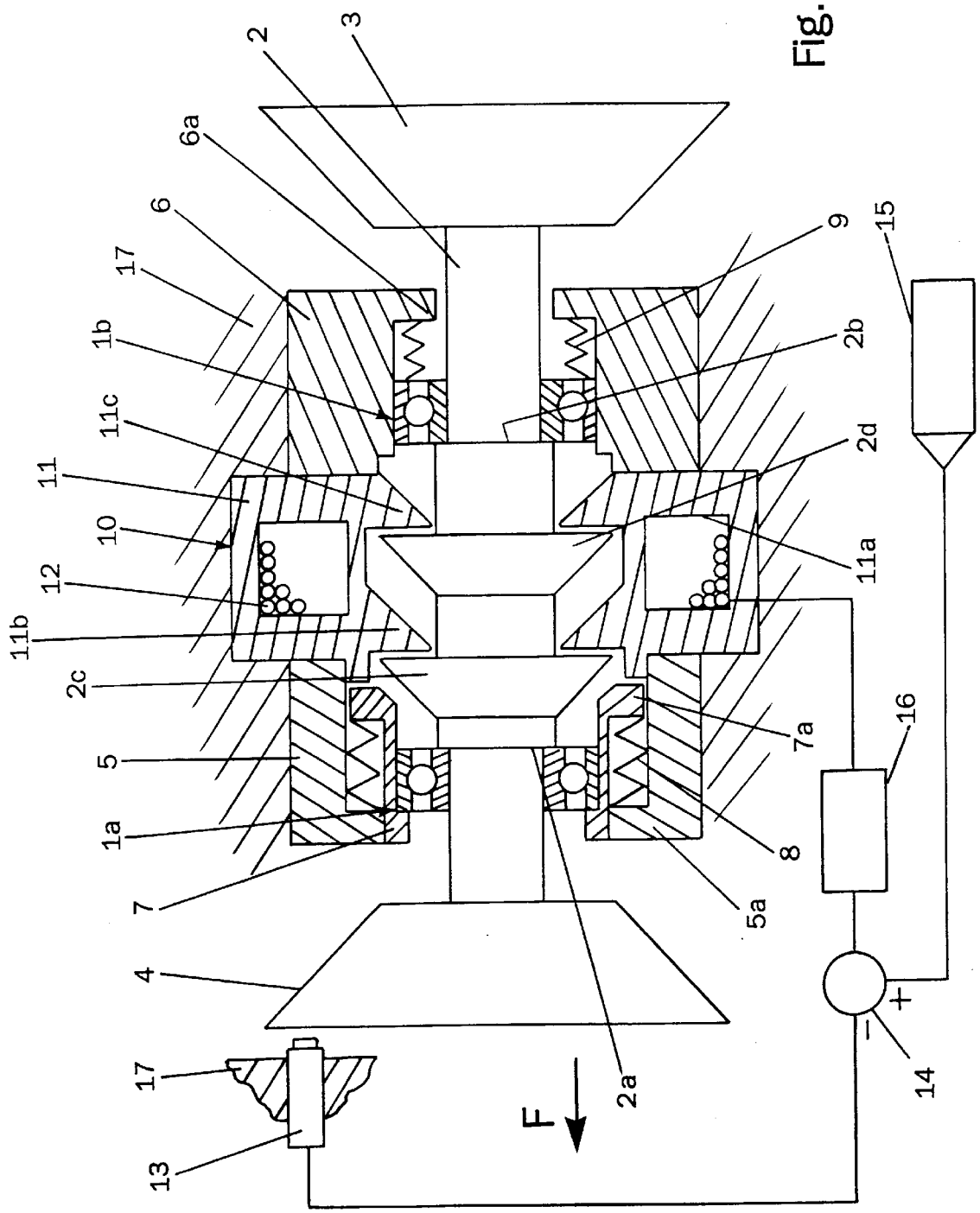

FIG. 1 shows a schematic view of a first embodiment of the present invention. Referring to FIG. 1, two sets of angular contact ball bearings 1a, 1b, which are shown as single elements here for clarity, are fitted to a shaft 2 which is made of a magnetically permeable material. An inner race of the angular contact ball bearing 1b is a push fit on one end portion of the shaft 2 so as to contact a step portion 2b formed on the shaft 2 and an outer race of the angular contact ball bearing 2b is a sliding fit in an inner bore of a cylindrical casing 6 which is fixed to an engine housing 17. The cylindrical casing 6 is provided with an inner flange portion 6a and a spring 9 is interposed between the outer race of the angular contact ball bearing 2b and the flange portion 6a so as to urge the outer race towards the step portion 2b and the angular contact ball bearing 1a. An inner race of the angular contact ball bearing 1a is a push fit on the other end side of the shaft 2 so as to contact a step portion 2a formed on the shaft 2. An outer race of the angular contact ball bearing 1a is carried by a cylindrical bearing carrier 7 having an outer flange portion 7a. The bearing carrier 7 is a sliding fit in a stepped bore of a cylindrical casing 5 which is fixed to the engine housing 17. The cylindrical casing 5 is provided with an inwardly directed flange portion 5a which is axially aligned with but spaced from the flange portion 7a of the bearing carrier 7, and a spring 8 is interposed between the flange portions 5a and 7a so as to urge the outer race towards the step portion 2a and the angular contact ball bearing 1b. As mentioned above, the shaft 2 is supported in the radial direction by the bearings 1a, 1b and the bearings 1a, 1b are pre-loaded by the springs 8,9 respectively so that the correct axial position of the shaft 2 is maintained in the stationary state.

One end of the shaft 2 supports a turbine 3 and a compressor 4 is mounted on the other end of the shaft 2. In this embodiment, the shaft 2 is provided with two frustro conical flange portions 2c and 2d which project outwardly between the step portions 2a and 2b. The flange portions 2c and 2d each have one planar surface and one conical surface, with the planar surfaces facing the turbine end of the shaft 2.

A magnetic bearing 10 is disposed around the flange portions 2c and 2d. The magnetic bearing 10 includes a cylindrical body 11 and an electromagnetic coil 12. The body 11 is made up from four pieces of magnetic material so as to form an annular space or void 11a therein. The body 11 is disposed between the casings 5 and 6 and is fixed to the casings 5 and 6 and the engine housing 17. The body 11 has two cone-shaped internally directed flange portions 11b and 11c. The flanges 11b and 11c are spaced apart in the axial direction and a planar face of each flange 11b, 11c is directly facing a corresponding planar face of each shaft flange 2c, 2d. An electromagnetic coil 12 is wound in the circular space 11a of the body 11. Thus, when the electromagnetic coil 12 is excited and the body 11 is magnetized, a magnetic flux path is formed between the body 11 and the shaft 2 through the respective pairs of adjacent flanges 2c, 11b and 2d, 11c. Preferably the casings 5, 6 are either non-magnetic or have a non-magnetic barrier to prevent magnetic flux leakage especially through the angular contact ball bearings 1a, 1b which are generally made from magnetic conducting material.

A position sensor 13 such as an eddy current device or a capacitance probe is disposed on the engine housing 17 so as to be aligned with but axially spaced from a rim of the compressor 4 in order to detect compressor tip clearance. Alternatively the axial position of the shaft 2 could be detected from any other convenient place. The position sensor 13 is connected to a comparator 14 so that the detected axial position can be compared with a set point value 15. The comparator 14 is connected to a compensator and coil current amplifier 16 which is connected to the electromagnetic coil 12 and which calculates the coil current required to maintain the set point value 15.

The above-described first embodiment of the gas turbine engine operates as follows. When the gas turbine engine is started, the direction of the aerodynamic force (thrust load) indicated by the arrow F works to separate the flanges 2c, 2d of the shaft 2 from the flanges 11b, 11c of the body 11 of the magnetic bearing 10, and to move the shaft 2 in the direction of the compressor 4. The axial position of the shaft 2 is detected as the compressor tip clearance by the position sensor 13 and the detected axial position is compared with the set point value 15 in the comparator 14. The resultant error signal is sent to the compensator and coil current amplifier 16. The compensator and coil current amplifier 16 calculate the required coil current in order to maintain the set point value 15 and the required coil current is supplied to the electromagnetic coil 12 of the magnetic bearing 10. Thereby, the body 11 of the magnetic bearing 10 is magnetized and the magnetic force works in opposition to the aerodynamic force so that the flanges 2c and 2d are attracted to the flanges 11b and 11c and therefore the correct axial position of the shaft 2 is maintained.

Since the correct axial position of the shaft 2 is maintained by the magnetic bearing 10, even though a high axial thrust load F may be acting on the shaft 2, bearing life of the angular contact ball bearings 1a, 1b extends dramatically and losses are reduced resulting in a more efficient machine.

By way of example the improvement in bearing life can be calculated in simple terms using the well known $L_{10}$ life calculation procedure which is as follows:

$$L_{10}=(C/P)_3,$$

in which:

$L_{10}$ =Basic rating life (millions of revolutions)
C=Basic dynamic load rating (N)
P=Equivalent dynamic bearing load (N)
Assume a bearing with C=6000N and P=2000N (where 200N is the required pre-load).

In case 1 where the bearing takes all of the axial load, $L_{10}$=27 million revolutions.

In case 2 where the axial load other than the set pre-load is taken by the magnetic bearing $L_{10}$=27000 million revolutions.

The life improvement in this case for a bearing rotating at 50,000 rpm is extended according to the invention from 9 hours to 9000 hours.

In the above embodiment, a closed loop system is utilized. However, it is possible to utilize fixed current operation or open loop operation. In the case of fixed current operation, when the gas turbine engine is started, or when the shaft speed reaches a certain value, or when the pressure ratio reaches a certain value or when any process variable reaches any certain condition, a relay circuit could simply energize the coil and the bearing load will be adjusted accordingly. In the case of open loop operation, the shaft speed could be detected and a control circuit used to increase the magnetic coil current as speed increased according to some function such as pressure ratio or any other process function which may be theoretical or empirical. If the fixed current operation or open loop operation were to be utilized then this could be achieved in this embodiment by axially locking the bearing carrier 7.

FIG. 2 shows a schematic view of a second embodiment of the invention. Referring to FIG. 2, two sets of angular contact ball bearings 21a and 21b, which are shown as single elements here for clarity, are fitted to a shaft 22 which is made of a magnetically permeable material. An inner race of the angular contact ball bearing 21a is a push fit on one end portion of the shaft 22 so as to contact with a step portion 22a formed on the shaft 22. An outer race of the angular contact ball bearing 21a is fitted into a first stepped bore portion of a cylindrical casing 25 which is fixed to an engine housing 40. The cylindrical casing 25 has an internally directed flange portion 25a and a spring 26 is interposed between the outer race of the angular contact ball bearing 21a and the flange portion 25a so as to urge the outer race towards the one end of the shaft 22. An inner race of the angular contact ball bearing 21b is a push fit on the other end portion of the shaft 22 so as to bring it into abutment with a step portion 22b formed on the shaft 22. An outer race of the angular contact ball bearing 21b is fitted into a cylindrical bearing carrier 27 having an outer flange portion 27a. The bearing carrier 27 is axially slidable in a second stepped bore portion of a cylindrical casing 25 which is fixed to the engine housing 40. The cylindrical casing 25 has an internally direction flange portion 25b and facing but axially spaced from the flange portion 27a of the bearing carrier 27, and a transducer 28 is connected between the flange portions 25b and 27a. The bearings 21a and 21b rotatably support the shaft 22 and are pre-loaded by the spring 26 so that the correct axial position of the shaft 22 is maintained in the stationary state. Furthermore, the shaft 22 is constrained axially by the transducer 28.

The transducer 28 is a load cell or force sensor which could be based on strain gauge devices or piezo or any appropriate sensor. It senses axial force, and is therefore responsive to the axial position of the shaft 22. In this embodiment, the transducer 28 is configured to work mainly in tension mode, although axial force could be detected in any convenient place using a tension, compression or combined tension/compression transducer.

At one end of the shaft 22, an outwardly directed flange portion 22c lies immediately outside the first stepped bore portion of the casing 25. A turbine 23 and a compressor 24 are fixed to the other end of the shaft 22. A magnetic rotor 29a is formed on the shaft 22 and a magnetic stator 29b is fixed to a large diameter bore portion which is between first and second stepped bore portions of the casing 25 so as to surround the rotor 29a. The magnetic rotor 29a and magnetic stator 29b are shown to represent the load. The load may however be an external gearbox, a turbo propeller or any process load.

A magnetic bearing 30 is disposed at open end of the above first stepped bore portion of the casing 25. The magnetic bearing 30 includes a cylindrical body 31 and an electromagnetic coil 32. The body 31 is made of a magnetic material and is inserted into the first stepped bore portion of the casing 25 so that one end face is immediately adjacent to and facing the flange portion 22c of the shaft 22. At the other end of the body 31, a flange portion 31a which is inwardly projected in the radial direction is formed. The electromagnetic coil 32 is wound on the inner circumferential surface of the body 31. Thereby, when the electromagnetic coil 32 is excited and the body 31 is magnetized, a magnetic flux path is formed between the body 31 and the shaft 22 through the flange portions 22c and 31a. Preferably the casing 25 is either non-magnetic or has a non-magnetic barrier to prevent magnetic flux leakage especially through the angular contact ball bearing 21a which is generally made from magnetic conducting material.

The transducer 28 is connected to a comparator 33 so that the detected axial force is compared with a set point value 34 in the comparator 33. The comparator 33 is connected to a compensator and coil current amplifier 35 which is connected to the electromagnetic coil 32 and which calculates the required coil current in order to maintain the set point value 34.

The second embodiment of the gas turbine engine operates as follows. When the gas turbine engine is started, the direction of the aerodynamic force F (thrust load) indicated by the arrow acts to separate the flange portion 22c of the shaft 22 from the adjacent surface of the body 31 of the magnetic bearing 30. Then, when the shaft 22 is moved leftwardly in FIG. 2 by the aerodynamic force F, the transducer 28 is placed in tension due to the movement of the bearing carrier 27 and detects the axial force. The detected axial force is compared with the set point value 34 in the comparator 33. The resultant error signal is sent to the compensator and coil current amplifier 35. The compensator and coil current amplifier 35 calculate the required coil current in order to maintain the set point value 34 and the required coil current is supplied to the electromagnetic coil 32 of the magnetic bearing 30. Thereby, the body 31 of the magnetic bearing 30 is magnetized and the magnetic force works in opposition to the aerodynamic force so that the flange portion 22c of the shaft 22 is magnetically attracted to the body 31 and therefore the correct axial position of the shaft 22 is maintained. According to this second embodiment, it is possible to obtain the same effects as the above first embodiment.

Since the axial thrust load is taken by the magnetic bearing and the correct axial position of the shaft is maintained by the magnetic bearing, even though a high axial load may be acting on the shaft, bearing life of the angular contact bearings extends dramatically and losses are reduced resulting in a more efficient machine. Thereby it is possible to reduce time and costs which are required for the maintenance.

We claim:

1. A gas turbine engine comprising turbine and compressor elements on a rotary shaft that is rotatably mounted in a stator body by bearings of the rotary type, in which there are provided electromagnetic means for opposing axial thrust loads on the shaft in use, comprising an electromagnetic coil supported in the stator body and surrounding the shaft, and means for energizing the electromagnetic coil in use to exert an electromagnetic axial force on the shaft to oppose axial thrust loads on the shaft resulting from rotation of the turbine and compressor elements, said shaft being rotatable mounted in said stator body by pre-loaded axial thrust bearings.

2. A gas turbine according to claim 1, wherein the means for energizing the coil includes means for modulating the excitation current through the coil.

3. A gas turbine according to claim 2, wherein the modulation of the excitation current is such as to balance axial thrust loads on the shaft in use.

4. A gas turbine according to claim 3, wherein the modulation of the excitation current is in response to a sensor that is sensitive to the axial position of the shaft.

5. A gas turbine according to claim 4, wherein the sensor is a position sensor which sense the axial position of the shaft.

6. A gas turbine according to claim 4, wherein the sensor is a transducer which detects the axial load acting on the shaft and derives therefrom the axial position of the shaft.

7. A gas turbine according to claim 4, wherein the means for modulating the excitation current operates closed loop to maintain a desired axial position of the shaft in use.

8. A gas turbine according to claim 1, wherein the shaft is provided with at least one outwardly direct flange portion facing a stator surface magnetizable by the electromagnetic coil, to establish a magnetic flux path between the stator surface and the flange portion when the electromagnetic coil is energized, thereby to impart an axial force on the shaft opposing the axial thrust loads in use.

9. A gas turbine according to claim 1 wherein the means for energizing the coil includes means for modulating the excitation current through the coil.

10. A turbine engine comprising:
a stator body;
at least one set of rotary bearings movably mounted within the stator body;
a rotary shaft having an axis and being rotatably mounted on the bearings in the stator body, said bearings being pre-loaded axial thrust bearings;
an electromagnetic coil located around the shaft; and a control element which controls the energy sent to the coil in order that the coil will retard axial displacement of the shaft as the shaft rotates, said control element further including a sensor responsive to the rotational speed to said shaft and the axial position of said shaft.

* * * * *